United States Patent [19]

Croyle et al.

[11] Patent Number: 5,360,043
[45] Date of Patent: * Nov. 1, 1994

[54] ASYMMETRIC TREAD FOR A TIRE

[75] Inventors: Warren L. Croyle, Akron; Randall R. Brayer, Uniontown, both of Ohio

[73] Assignee: The Goodyear Tire & Rubber Company, Akron, Ohio

[*] Notice: The portion of the term of this patent subsequent to Apr. 20, 2007 has been disclaimed.

[21] Appl. No.: 736,182

[22] Filed: Jul. 26, 1991

[51] Int. Cl.$^5$ .............................................. B60C 11/11
[52] U.S. Cl. .............................. 152/209 A; 152/209 R
[58] Field of Search .......... 152/209 R, 209 D, 209 A; D12/146, 147

[56] References Cited

U.S. PATENT DOCUMENTS

| | | |
|---|---|---|
| D. 296,093 | 6/1988 | Mezzanotte . |
| D. 312,062 | 11/1990 | Convert et al. .................. D12/147 |
| D. 320,967 | 10/1991 | Covert et al. .................. D12/147 |
| D. 320,968 | 10/1991 | Maxwell et al. .................. D12/147 |
| 1,956,011 | 4/1934 | Evans . |
| 2,534,869 | 12/1950 | Jones . |
| 3,155,135 | 11/1964 | Klenk . |
| 3,162,229 | 12/1964 | Ellenrieder et al. . |
| 3,286,756 | 11/1966 | Ellenrieder et al. . |
| 3,405,753 | 10/1968 | Verdier . |
| 3,705,613 | 12/1972 | Verdier . |
| 3,861,436 | 1/1975 | Poque . |
| 4,429,728 | 2/1984 | Ippen et al. . |
| 4,667,717 | 5/1987 | Graas . |
| 4,732,194 | 3/1988 | Saneto et al. . |
| 4,777,993 | 10/1988 | Yamashita et al. . |
| 4,785,863 | 11/1988 | Tsuda et al. . |
| 4,848,429 | 7/1989 | Mezzanotte . |
| 5,010,936 | 4/1991 | Numata et al. . |

FOREIGN PATENT DOCUMENTS

| | | |
|---|---|---|
| 0114594 | 8/1984 | European Pat. Off. . |
| 0192911 | 9/1986 | European Pat. Off. . |
| 0479761 | 4/1992 | European Pat. Off. . |
| 0479763 | 4/1992 | European Pat. Off. . |
| 2263455 | 7/1974 | Germany . |
| 3032906 | 2/1991 | Japan ........................ 152/209 A |

OTHER PUBLICATIONS

Tire Review Sep. 1989.

Primary Examiner—Michael W. Ball
Assistant Examiner—Nancy T. Krawczyk
Attorney, Agent, or Firm—David L. King

[57] ABSTRACT

An asymmetric directional tread for a tire is disclosed. The tread has a plurality of ground engaging tread elements separated by grooves. The grooves include one wide circumferentially continuous groove having a width W, a plurality of circumferentially continuous grooves of an intermediate width between greater than $\frac{1}{3}$ and $\frac{3}{4}$W, at least one narrow circumferentially continuous groove having a width 1/10 to less than $\frac{1}{3}$W located between a lateral edge and a circumferentially continuous groove of a greater width, and first and second sets of laterally extending grooves. The first set extends from the outboard lateral edges to an end location within 5% of the tread width from the equatorial plane. The second set extends from the inboard lateral edge to an end location within 5% of the tread width from the equatorial plane.

8 Claims, 4 Drawing Sheets 5,360,043

ASYMMETRIC TREAD FOR A TIRE

BACKGROUND OF THE INVENTION

The invention relates to an asymmetric directional tread for a pneumatic tire. The tread is particularly well suited for use on high performance radial tires.

Sports car and high performance vehicle enthusiasts require tires capable of high speeds, good cornering and turning response, steering responsiveness, and good braking responsiveness.

The vehicles currently available can put extremely high design requirements on the tires. Vehicles such as the Corvette ZR-1 for example are capable of reaching speeds above 180 mph.

To accommodate these vehicles, tires specifically adapted to performance vehicles have been developed. These tires are known in the art as speed rated tires. For example, Z rating means that the tire is designed to withstand over 146 mph speeds while under normal load for over 10 minutes.

The ability to survive high speeds is only one factor the tire must meet. The high performance tires must also provide good traction under dry, wet, and snow covered road conditions. The tire ideally should permit the vehicle to perform to its full design potential. That is the tires should be capable of maintaining traction or grip in high speed turns, transfer the acceleration torque the engine produces to the road without spinning the tires, provide braking traction at high speed capable of stopping the vehicle in as short a distance as feasible without damaging the tires, and provide a tire with reasonable tread wear.

To meet the needs of these high performance vehicles, improvements in tires have been required.

The present invention provides an asymmetrical directional tread for a pneumatic tire. The tread is particularly well suited for high performance radial tires.

SUMMARY OF THE INVENTION

An asymmetric directional tread for a tire is disclosed. The tread when annularly configured has an axis of rotation, a tread width, inboard and outboard lateral edges and an equatorial plane centered between the edges. The tread comprises a plurality of ground engaging tread elements separated by grooves. The grooves comprise one wide circumferentially continuous groove, a plurality of intermediate width circumferentially continuous grooves, at least one narrow circumferentially continuous groove, and first and second sets of plurality of lateral grooves. The wide circumferential groove has a width W. The intermediate width grooves have a width between greater than ⅓ and ¾W. The narrow groove or grooves have a width between 1/10 to less than ⅓W and are between a lateral edge and a circumferential groove of greater width. The first set of lateral grooves extend angularly from the outboard lateral edge to an end location in proximity of the equatorial plane, the end location being within 5% of the tread width from the equatorial plane intersecting at least one circumferential groove. The lateral grooves of the first set have an intermediate width of ⅓ to ¾W over a distance between 50% and 100% of the length of the lateral groove. The second set of lateral grooves are oppositely angled over a majority of their length relative to the first set of lateral grooves. The second set extends from the inboard lateral edge to an end location in proximity of the equatorial plane, the end location being within 5% of the tread width from the equatorial plane. [and] The second set of lateral grooves have a width between ⅓ and ½W.

DEFINITIONS

"Axial" and "axially" are used herein to refer to lines or directions that are parallel to the axis of rotation of the tire.

"Circumferential" means lines or directions extending along the perimeter of the surface of the annular tread perpendicular to the axial direction.

"Radial" and "radially" are used to mean directions radially toward or away from the axis of rotation of the tire.

"Lateral" means an axial direction.

"Compensated Tread Width" means the tread width multiplied by the aspect ratio.

"Aspect ratio" of a tire means the ratio of the section height to the section width.

"Footprint" means the contact patch or area of contact of the tire tread with a flat surface at zero speed and under normal load and pressure, including the area occupied by grooves as well as the tread elements.

"Net-to-gross" means the total area of ground contacting tread elements with the footprint divided by the gross area of the footprint.

"Groove" means an elongated void area in a tread that may extend circumferentially or laterally about the tread in a straight, curved, or zig-zag manner. Circumferentially and laterally extending grooves sometimes have common portions and may be subclassified as "wide", "intermediate width", "narrow", or "slot". The slot typically is formed by steel blades inserted into a cast or machined mold or tread ring therefor. In the appended drawings, slots are illustrated by single lines because they are so narrow. A "slot" is a groove having a width in the range from about 0.2% to 0.3% of the compensated tread width, whereas a wide groove has a width (W) greater than 2% of the compensated tread width, an intermediate width groove has a width ⅓ to ¾W, and a narrow groove has a width of 1/10 to ⅓W. The "groove width" is equal to tread surface area occupied by a groove or groove portion, the width of which is in question, divided by the length of such groove or groove portion; thus, the groove width is its average width over its length. Grooves, as well as other voids, reduce the stiffness of the tread regions in which they are located. Slots often are used for this purpose, as are laterally extending narrow or wide grooves. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Sipe" means small slots molded into the tread elements of a tire that subdivided the tread surface and improves tractions.

"Inside Shoulder" as used herein means the shoulder nearest the vehicle.

"Outside Shoulder" as used herein means the shoulder farthest away from the vehicle.

"Rib" means a circumferentially extending strip of rubber on the tread which is defined by at least one circumferential groove and either a second such groove or a lateral edge, the strip being laterally undivided by full-depth grooves.

"Tread Element" means a rib or a block element.

"Equatorial plane (EP)" means the plane perpendicular to the tire's axis of rotation and passing through the center of its tread.

DETAILED DESCRIPTION OF THE INVENTION

Figure 1:
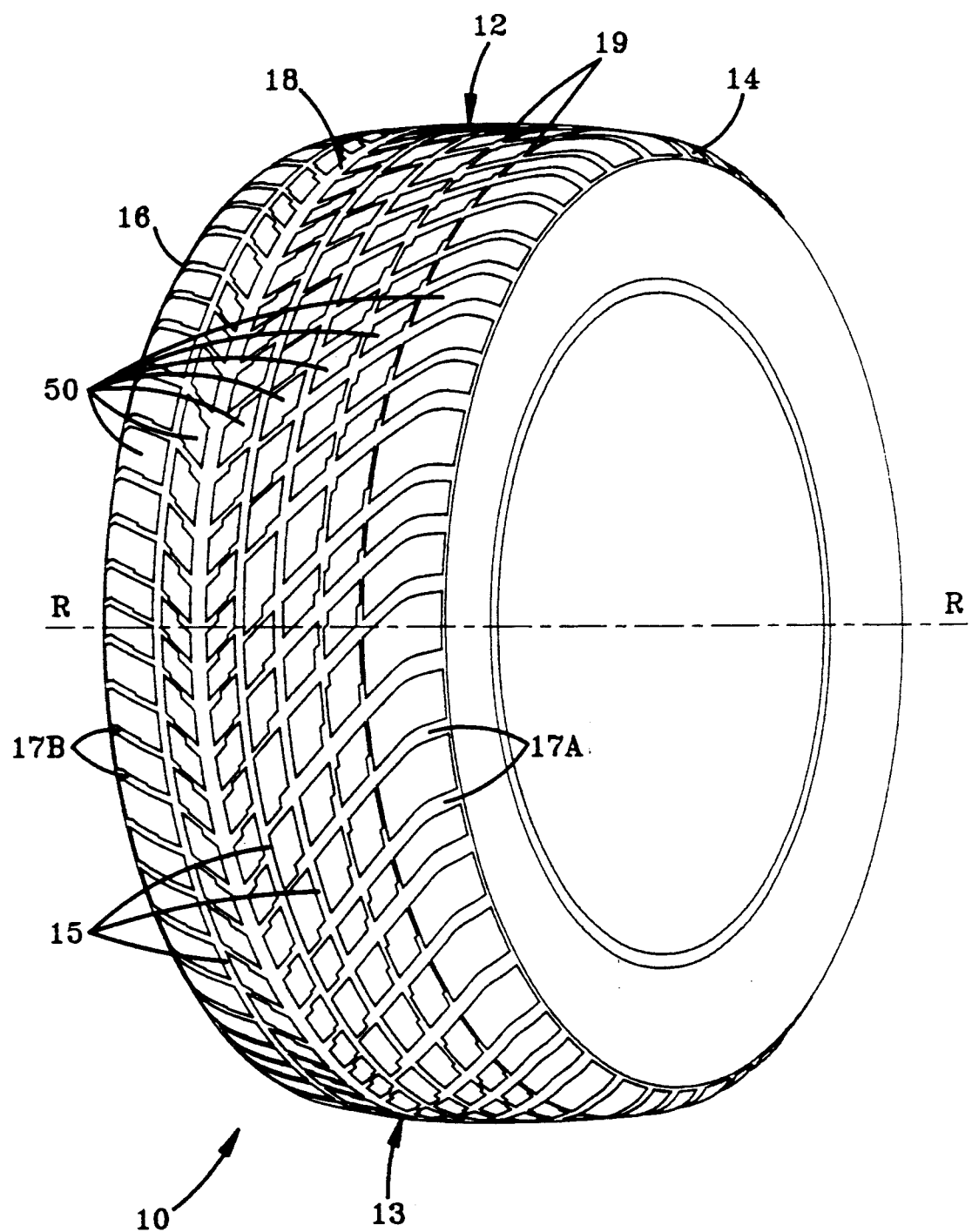
FIG. 1 is a perspective view of a tread according to the present invention annularly attached to a tire.

With reference to FIG. 1, a tread 12 according to the present invention is illustrated. The tread 12 is annularly attached to a tire 10. The tread 12 as illustrated, is asymmetric and directional.

An asymmetric tread has a tread pattern that is not symmetrical about the centerplane or equatorial plane of the tire.

A directional tread is a tread that has a preferred direction of forward travel and must be positioned on a vehicle to insure that the tread pattern is aligned with the preferred direction of travel.

The use of directional tread patterns enables the tread to be optimized for forward travel. Conventional non-directional tires are designed such that the tire can be mounted without a preferred direction of travel. This means that the tread must perform equally well regardless of how the tread is mounted to the tire. For this reason non-directional tire treads are generally designed specifically to give uniform performance in either direction of travel. The non-directional feature is an additional design constraint that forces design compromises that limit the performance capability of the tire.

The conventional passenger tire also has a tread pattern that is symmetrical relative to the centerplane of the tread. This enables the tire to freely be mounted independent of the direction of travel on either side of the vehicle. This symmetry of design assumes that the design loads and requirement s must be equally met regardless of the tire orientation.

The use of an asymmetric tire with a directional tread means that there are left side and right side tires. This enables the tire designer to optimize the tread design to accommodate the vehicle requirements. The axial or lateral extent of the tread design can be varied to enhance performance.

Figure 2:
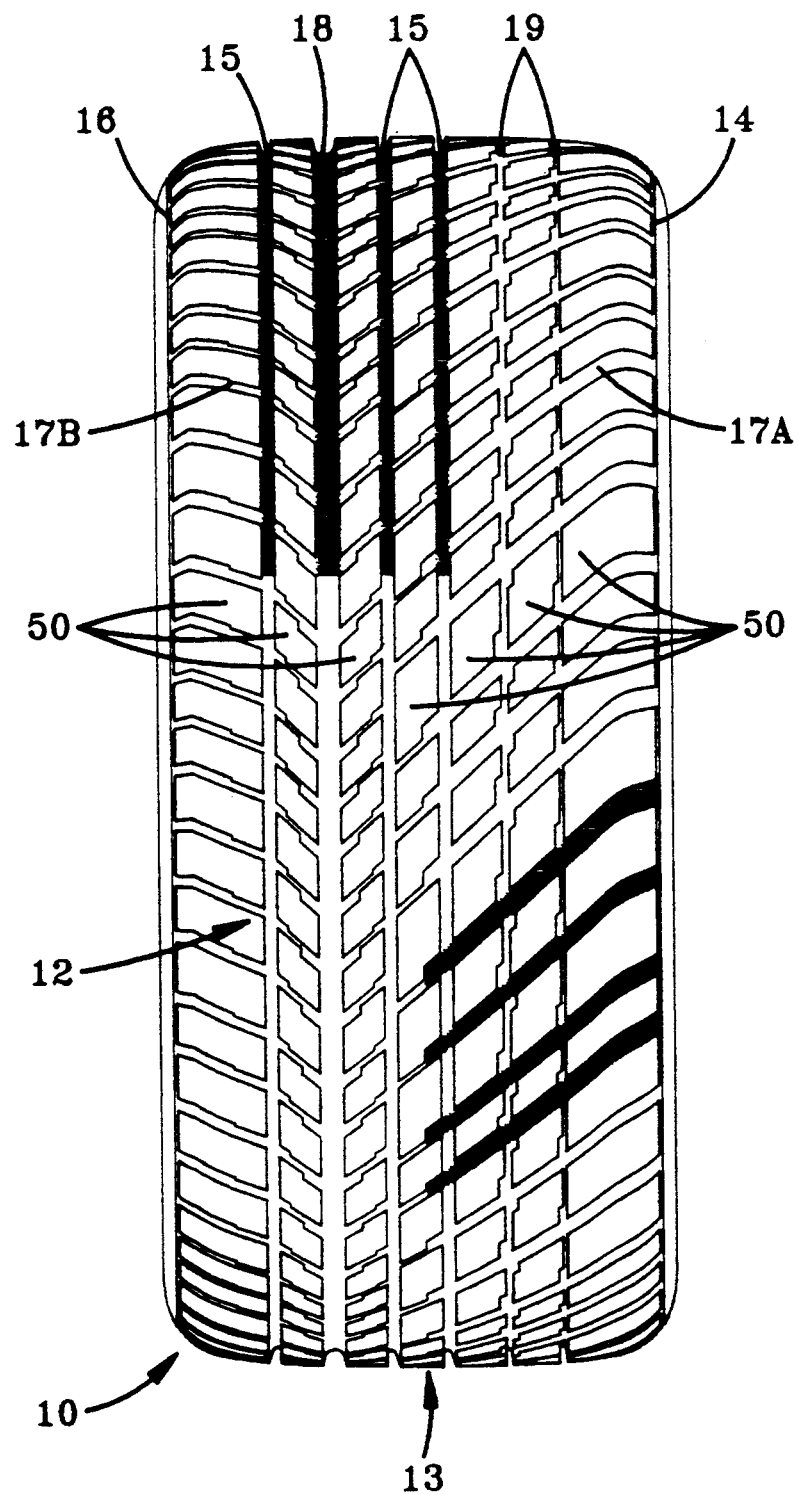
FIG. 2 is a plan view of the tread illustrated in FIG. 1.

The tread 12 illustrated in FIG. 1-2 is one example of an asymmetric-directional design according to the present invention.

The tread when configured annularly has an axis of rotation R, inboard and outboard lateral edges 16, 14 respectively, and a central portion 13 therebetween.

The tread has a plurality of ground engaging tread elements 50 separated by grooves. The grooves are uniquely configured relative to each other thereby creating a tread pattern that has excellent traction characteristics.

The grooves include one wide circumferentially continuous groove 18 having a width W. In the illustrated embodiment the wide groove 18 is located between the inboard lateral edge 16 and the equatorial plane of the tread. As illustrated the wide groove 18 is located at about 33% of the tread width from the inboard lateral edge 16, preferably the groove 18 should be located between 25% to 40% of the tread width from the inboard lateral edge 16. The wide groove has a width W in the range of 2% to 10% of the compensated tread width. (TW) In the preferred embodiment W equals about 3%.

The grooves further include a plurality of circumferentially continuous grooves 15 of an intermediate width. The intermediate width is between $\frac{1}{3}$ and $\frac{3}{4}$W. A pair of intermediate width circumferential grooves 15 are located between the outboard lateral edge and the wide groove and a single intermediate circumferential groove 15 is located between the inboard lateral edge and the wide groove in the embodiment as illustrated in FIGS. 1 and 2. The three intermediate grooves 15, as illustrated, are positioned from the inboard lateral edge 16 distances of about 20% of the tread width, 45% of the tread width, and 60% of the tread width, respectively. The number of intermediate width grooves and their locations can vary according to tire size. The illustrated tread of FIG. 1-2 was designed for a P275/40 ZR17 size designation. For a narrow 205 tire for example one intermediate width groove and a row of block elements can be eliminated preferably the one furthest from the inboard lateral edge 16.

The tread also includes at least one circumferential narrow groove 19 having a width in the range of 1/10W to $\frac{1}{3}$W. The narrow groove 19 or grooves 19 are located between a lateral edge 14, 16 and the intermediate width circumferential grooves In the illustrated embodiment two such narrow grooves 15. 19 are shown near the outboard lateral edge 14. The first narrow groove 19 is adjacent the outboard edge and is located about 20% of the TW from the edge 14 and the second narrow groove 19 is located about 33% of the tread width from the outboard edge 14. The exact number of narrow grooves and their precise locations may be varied to accommodate the variations of sizes and widths of tires.

Additionally it is possible to provide narrow grooves 19 adjacent to both lateral edges 14, 16. For example the intermediate width groove 15 adjacent the wide groove 18 and the inboard lateral edge 16 could be replaced with a narrow groove 19 and the second narrow groove 19 on the outboard side could be replaced with an intermediate width groove 15.

The narrow grooves 19 in proximity of a lateral edge 14 are specifically designed in the preferred embodiment to permit the tread elements adjacent the groove 19 to flex into the groove void. The walls of the elements contact the walls of the laterally adjacent tread elements. This contact reinforces and increases the lateral stiffness of the tread 12 which in turn means the vehicle can handle higher speed turns. The wide and intermediate groove voids remain open thus insuring no significant loss of traction occurs under wet conditions.

The tread also has first and second sets of lateral grooves 17A 17B, the first set 17A extending angularly from the outboard lateral edge 14 to within 5% of the treadwidth from the equatorial plane of the tread, the second set 17B extending angularly from the inboard lateral edge 16 to within 5% of the tread width of the equatorial plane of the tread. The first set of lateral grooves 17A has an intermediate width of ⅛ to ⅜W over a distance between 50% and 100% of the length of the lateral groove. The second set of a plurality of lateral grooves 17B are oppositely angled relative to the first set of lateral grooves 17A over a majority of their length. At the intersection of the second set of grooves 17B and the wide circumferential groove 18, the angular inclination of the second set of grooves 17B changes and the grooves 17B are thereafter angularly oriented similar to the lateral grooves of the first set 17A between the wide groove 18 and an intermediate width groove 15. At the intermediate groove 15 the first and second set of lateral grooves terminate their axially inward progression. The intermediate width groove is in the central portion 13 of the tread 12. The lateral grooves of the second set have a width between ⅛ and ¼W.

The first set of lateral grooves may intersect and join the second set of lateral grooves forming a continuous lateral groove path across the entire tread width. Alternatively the first and second sets of grooves may be laterally or circumferentially spaced never connecting, or may meet at a groove as illustrated in the preferred embodiment.

In the preferred embodiment the width of the first set of lateral grooves 17A is approximately equal to the intermediate width of the circumferential grooves 15. The width of the first set of lateral grooves 17A is also greater than the width of the second set of lateral groove 17B, preferably at least two times greater.

The tread 12 as illustrated in FIGS. 1–5B as described above has a net-to-gross ratio of 64%. The tread is laterally divided into two regions, an inboard and an outboard region. The outboard region is located between the first lateral edge 14 and extends inwardly to about 55% of the tread width. The inboard region is adjacent the outboard region and extends outwardly to the second lateral edge 16. The outboard region has a net-to-gross ratio of 68.9% and the inboard region has a net-to-gross ratio of 59.9%. The higher outboard region provides good tread wear and dry traction while the inboard region insures good wet and snow traction. The combination of the two regions enables the tire tread 12 to achieve excellent performance capabilities.

Figure 3:
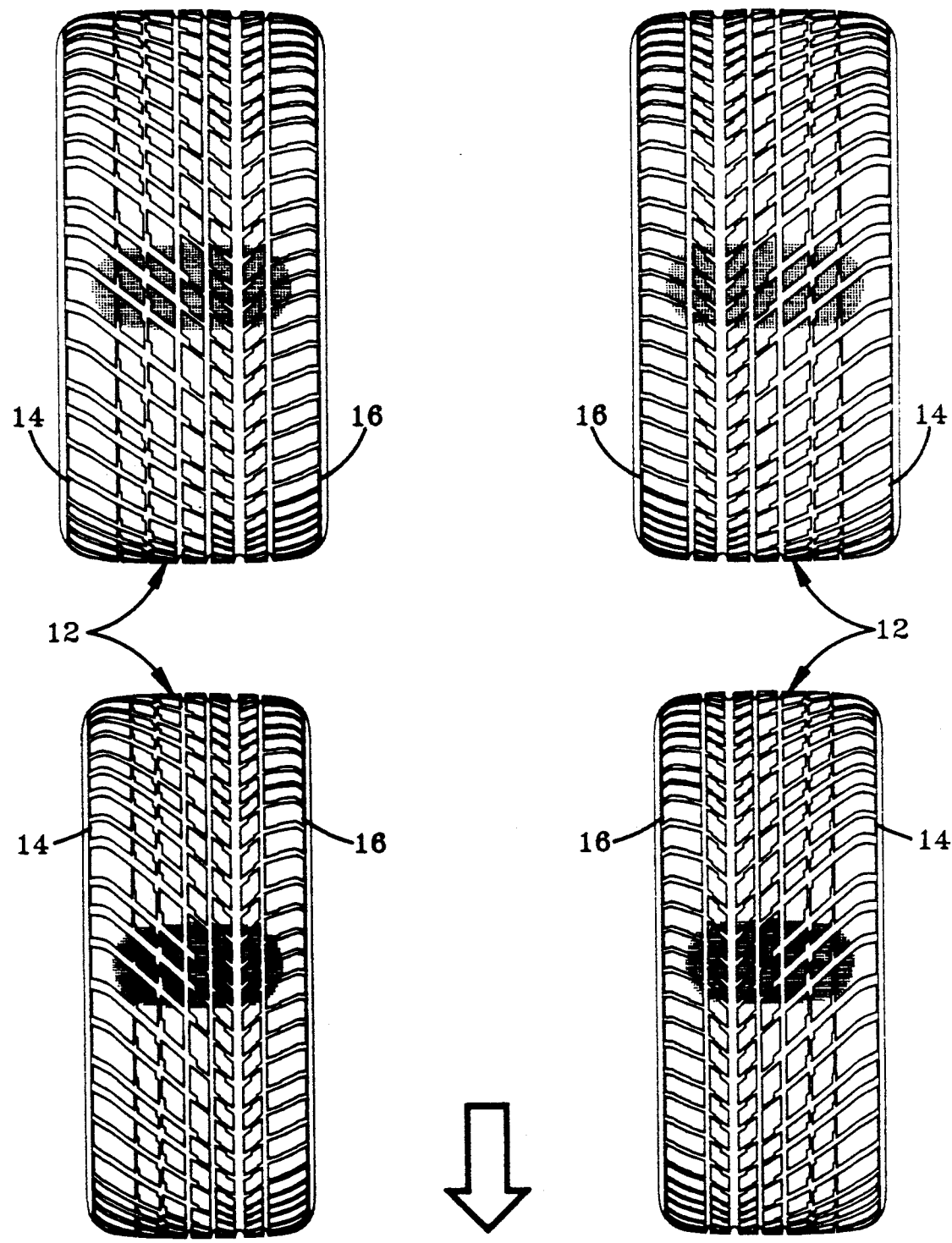
FIG. 3 is a view illustrating the footprints of the tire in the four wheel positions of a vehicle.
Figure 4:
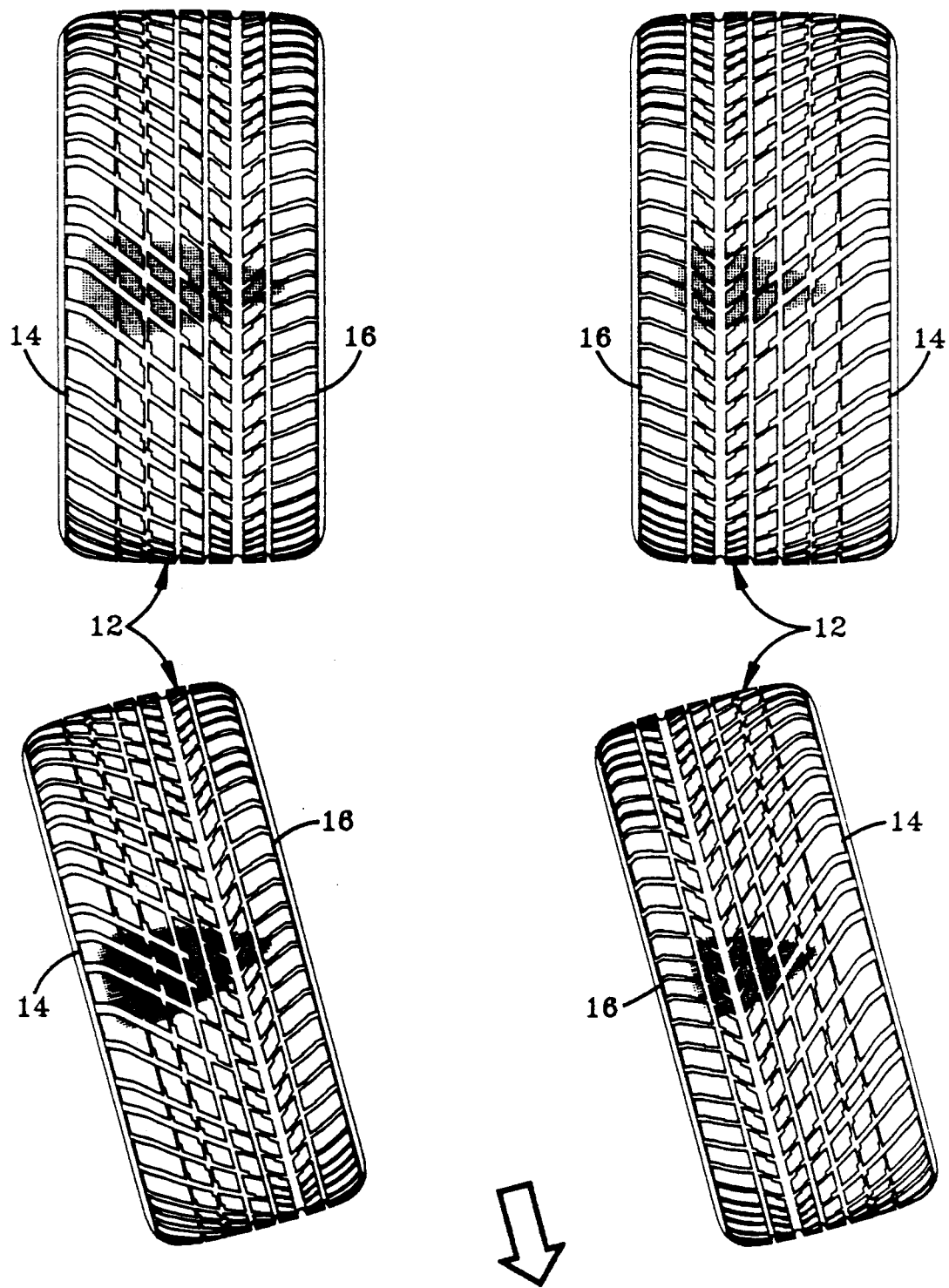
FIG. 4 is a view illustrating the footprints of the tire in the four wheel positions of FIG. 3 subjected to a turn or cornering maneuver.

FIGS. 3 and 4 illustrate a set of tires having treads according to the present invention. The tires are aligned according to the preferred direction and asymmetrically orientations. In FIG. 3 the shaded areas represents the footprints of each tire in a forward straight line direction of travel in FIG. 4 the shaded areas represent the theoretical effective footprints of the tires in a hard turning maneuver. As can be seen the outboard set of tires have a larger effective footprint than the inboard tires. The outboard tires absorbing the majority of the vehicles weight as the car turns.

As illustrated in FIG. 3, the combination of lateral grooves and circumferential grooves in the footprint or contact patch of the tire represents almost all of the water evacuation capacity of the tire, absent some limited amount absorbed by siping. By using narrow grooves near the outer lateral edge it is estimated that the tread water evacuating capacity in a hard cornering maneuver is reduced by less than 5% when the narrow groove void is occupied by the flexing outboard tread elements. Correspondingly the increased stiffness that results actually improves the overall traction in fast wet turns.

Additionally as the tire turns the intermediate width lateral groove on the outboard set of tires angularly moves to alignment with the direction of vehicle travel. The wide lateral grooves as illustrated, facilitates water channeling through the grooves in hard turning maneuvers. This reduces the potential for hydroplaning in such turns.

The tire of the present invention can be produced with undercut or negative angle trailing edge surfaces at the tread elements adjacent to the lateral edges. A co-pending patent application Ser. No. 06/736,189, describes in detail this design concept.

Also, the tread may have circumferential groove walls with variations in the angular orientation of the walls as a function of axial distance from the first or outboard lateral edge. A detailed description of such angular variations is described in co-pending patent application Ser. No. 07/736,184.

Also, the tread as illustrated may employ two independent angularly oriented pitches. The pitches being different in number and length are described in detail in co-pending patent application Ser. No. 07/736,192.

The tread may also be manufactured with crowned tread elements as described in U.S. Pat. No. 4,722,738.

Each of the teachings described above are incorporated herein by reference.

Experimental tests under a variety of conditions were conducted with tires made according to the present invention. As a control commercially available tires of the same size designation as the test tires was utilized. Comparison of the tires were made under identical test conditions. To insure comparative results the same vehicle was used for each particular trial.

The tread according to the present invention was tested in two versions. One version included the crowned tread elements and the variation in circumferential groove angles. A second test version did not have those two features but was identical to the first test version tires in all other respects. As a control, test versions of the tire according to the present invention were compared to a Goodyear Eagle ZR50 high performance tire.

All tires tested were of a P245/50ZR16 size designation. The treads were attached to a radial ply tire comprising a pair of annular beads; a carcass, including two radial plies oppositely angled at 85° relative to the equatorial plane of the tire, a liner, a pair of apexes; a belt and an overlay both positioned between the carcass and the tread; a pair of sidewall extending from the bead regions to the tread along the outer surface of the carcass.

The test and control tires were similarly constructed, however the test tire utilized a different tread compound than the control tire. This insured that the comparison was fundamentally a function of the tread design differences.

A summary of the test results revealed the following:

1.) The test tires performed the same or better than the control tires in every test but a force & moment test and a dry handling subjective test.

2.) The conventional tread element test tire performed better than the crowned element test tire in terms of noise, and was also slightly faster.

3.) The overall high speed performance of both test tires was improved over the control tire.

4.) The crown elements test tires were superior in terms of hydroplaning.

The following table illustrates the test results. The raw data is normalized with the control tire being the standard.

| Test | Control Tire Goodyear Eagle ZR50 | Test Tire Conventional Elements | Test Tire Crown Elements |
|---|---|---|---|
| Groove Wander | 100% | 100% | 100% |
| Noise (Subjective) | 100% | 125% | 100% |
| Normal Handling | 100% | 98% | 100% |
| Ride | 100% | 100% | 101% |
| Max Wet Handling (Subjective) | 100% | 104% | 106% |
| Max Wet Handling (Time) | 100% | 101% | 101% |
| Max Dry Handling (Subj) | 100% | 101% | 99% |
| Max Dry Handling (Time) | 100% | 100.4% | 100.1% |
| High Speed | 100% | 111% | 111% |
| Hydroplaning at 80 MPH | 100% | 110% | 121% |
| Normal Cornering Force (Cornering (Coefficient) | 100% | 91% | 87% |
| Aligning Torque | 100% | 97% | 95% |

In the max dry handling test the actual lap times were recorded although the test tires with crowned elements were subjectively rated slightly lower, they were actually faster through the course.

In terms of overall performance the normalized data verifies that both test tires are superior to the control tire. The test tires are clearly faster in both wet and dry conditions. The significance of the tests results are more remarkable when one considers that the control tire is considered by high performance car manufacturers and purchaser's of such vehicles as the tire of choice.

The wet handling subjective test results was also confirmed by faster lap times.

With regard to wet traction hydroplaning, the test was conducted at a speed of 80 mph. The amount of footprint area at 80 mph is compared to the 2 mph footprint area. The control measured 40.6% retained area, the tread with conventional tread elements measured 44.7% and the crowned tread element test tire according to the present invention retained 49.3% of the area. For comparison a commercially available high performance tire, the Bridgestone RE71, was similarly tested and that tire retained only 32.8% of its 2 mph footprint area.

From the above test data it is clear that a tread made according to the present invention can improve the overall performance of a high performance tire, the tread exhibiting superior traction and speed capabilities compared to that of commercially available tires.

It is claimed:

1. An asymmetric directional tread for a tire wherein the tread when configured annularly has an axis of rotation, a tread width TW, first and second lateral edges and an equatorial plane centered between the edges, the tread comprising a plurality of ground engaging tread elements separated by grooves, the grooves comprising one wide circumferentially continuous groove having a width W, located in a range of 25% to 40% of the tread width TW from the first lateral edge, a plurality of circumferentially continuous grooves of an intermediate width between greater than $\frac{1}{8}$ and $\frac{3}{4}$W, at least one circumferentially continuous groove narrower than the intermediate width groove having a width 1/10 to less than $\frac{1}{8}$W, the wide groove located between circumferential grooves of a lesser width and the narrow grooves being axially located in proximity to and axially between a lateral edge and a circumferential groove of greater width, a first set of lateral grooves extending angularly from the second lateral edge to a first axially inner end location of the first set of lateral grooves in proximity of the equatorial plane, the axially inner end location being within 5% of the tread width from the equatorial plane and intersecting at least one circumferential groove, the lateral grooves of the first set having an intermediate width of $\frac{1}{8}$ to $\frac{3}{4}$W over a distance between 50% and 100% of the length of the lateral groove, a second set of lateral grooves oppositely angled over a majority of the length of the groove relative to the lateral grooves of the first set, the lateral grooves of the second set extending from the first lateral edge to an axially inner end location of the second set of lateral grooves in proximity of the equatorial plane, the axially inner end location of the second set of lateral grooves being within 5% of the tread width from the equatorial plane, the second set of lateral grooves having a width between $\frac{1}{8}$ and $\frac{1}{2}$W the width of the first set of lateral grooves being greater than the width of the second set of lateral grooves.

2. The tread of claim 1 wherein the second set of lateral grooves intersect the wide circumferential groove.

3. The tread of claim 2 wherein the second set of lateral grooves changes angular orientation at the wide circumferential groove.

4. The tread of claim 3 wherein the angular orientation of the second set of lateral grooves is similar to the angular orientation of the first set of lateral groove between the wide circumferential groove and an intermediate width circumferential groove.

5. The tread of claim 4 wherein the first and second set of lateral grooves terminate at an intermediate width groove of the tread.

6. The tread of claim 1, wherein the lateral grooves of the first set extend to and intersect the lateral grooves of the second set thereby forming a continuous groove path.

7. The tread of claim 1 wherein the lateral grooves of the first set have a width greater than the width of the second set of lateral grooves.

8. The tread of claim 7 wherein the width of the first set of lateral grooves is at least two times greater than the width of the second set of lateral grooves.

* * * * *